(12) United States Patent
Kang et al.

(10) Patent No.: US 12,044,929 B2
(45) Date of Patent: Jul. 23, 2024

(54) DISPLAY MODULE AND TRANSPARENT DISPLAY APPARATUS

(71) Applicants: Hefei BOE Display Technology Co., Ltd., Anhui (CN); BOE Technology Group Co., Ltd., Beijing (CN)

(72) Inventors: Wei Kang, Beijing (CN); Jianming Liu, Beijing (CN); Wenbo Dong, Beijing (CN); Chaoyue Wang, Beijing (CN); Xingfu Zhang, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 184 days.

(21) Appl. No.: 17/630,111

(22) PCT Filed: Apr. 9, 2021

(86) PCT No.: PCT/CN2021/086118
§ 371 (c)(1),
(2) Date: Jan. 25, 2022

(87) PCT Pub. No.: WO2021/238432
PCT Pub. Date: Dec. 2, 2021

(65) Prior Publication Data
US 2022/0283468 A1  Sep. 8, 2022

(30) Foreign Application Priority Data

May 27, 2020 (CN) .......................... 202020923881.5

(51) Int. Cl.
*G02F 1/13357* (2006.01)
*G02F 1/1335* (2006.01)

(52) U.S. Cl.
CPC .. *G02F 1/133615* (2013.01); *G02F 1/133504* (2013.01); *G02F 1/133524* (2013.01); *G02F 1/133553* (2013.01)

(58) Field of Classification Search
CPC ......... G02F 1/133615; G02F 1/133504; G02F 1/133524; G02F 1/133553
See application file for complete search history.

(56) References Cited

U.S. PATENT DOCUMENTS

| 2014/0011087 A1 | 1/2014 | Ozaki et al. |
| 2017/0351009 A1 | 12/2017 | Matsuo et al. |
| 2018/0348411 A1 | 12/2018 | Yamaki et al. |

FOREIGN PATENT DOCUMENTS

| CN | 104020919 A | 9/2014 |
| CN | 104360762 A | 2/2015 |

(Continued)

*Primary Examiner* — Anne M Hines
(74) *Attorney, Agent, or Firm* — IPro, PLLC

(57) ABSTRACT

Disclosed are a display module and a transparent display apparatus. The display module includes: a transparent light guide plate including a grid dot face and a light emergent face, and a light incident face connecting the grid dot face and the light emergent face; a side-type light source, located on the side of the transparent light guide plate where the light incident face is located; a transparent adhesive layer including a first face and a second face, with the first face being disposed in contact with the grid dot face of the transparent light guide plate, the refractive index of the transparent adhesive layer is different from the refractive index of the transparent light guide plate, and the transparent adhesive layer contains particles that scatter light; and a transparent reflecting layer, disposed in contact with the second face of the transparent adhesive layer.

17 Claims, 4 Drawing Sheets

(56) References Cited

FOREIGN PATENT DOCUMENTS

| | | | |
|---|---|---|---|
| CN | 105607179 | A | 5/2016 |
| CN | 106646987 | A | 5/2017 |
| CN | 107209292 | A | 9/2017 |
| CN | 108292090 | A | 7/2018 |
| CN | 208207271 | U | 12/2018 |
| CN | 210005829 | U | 1/2020 |
| CN | 110928046 | A | 3/2020 |
| CN | 212460999 | U | 2/2021 |
| JP | 2008185935 | A | 8/2008 |
| JP | 2014017363 | A | 1/2014 |
| KR | 20140073967 | A | 6/2014 |
| WO | 2009093573 | A1 | 7/2009 |

DISPLAY MODULE AND TRANSPARENT DISPLAY APPARATUS

CROSS REFERENCE TO RELATED APPLICATIONS

The present application is a US National Stage of International Application No. PCT/CN2021/086118, filed on Apr. 9, 2021, which claims priority to Chinese Patent Application No. 202020923881.5, entitled "Display Module and Transparent Display Apparatus", and filed to the China Patent Office on May 27, 2020, the entire contents of which are incorporated herein by reference.

FIELD

The present disclosure relates to the field of displays, in particular to a display module and a transparent display apparatus.

BACKGROUND

A transparent display means that the display itself has a certain degree of light penetration, which allows a user to clearly see a background behind the display while watching a display picture of the display. Therefore, the transparent display is suitable for being applied to building windows, high-speed rails, subways, shop windows or the like.

SUMMARY

An embodiment of the present disclosure provides a display module, including: a transparent light guide plate, including a grid dot surface and a light emitting surface that are disposed opposite each other, and a light incident surface connected to the grid dot surface and the light emitting surface; a side-type light source, located on a side of the light incident surface of the transparent light guide plate; a transparent adhesive layer, including a first surface and a second surface that are disposed opposite each other, and the first surface is disposed in contact with the grid dot surface of the transparent light guide plate; and a refractive index of the transparent adhesive layer is different from a refractive index of the transparent light guide plate, and the transparent adhesive layer contains particles that scatter light; and a transparent reflecting layer, disposed in contact with the second surface of the transparent adhesive layer, and having a set haze.

Optionally, in the above display module provided by the embodiment of the present disclosure, a material of the transparent adhesive layer is an optical clear adhesive (OCA), and a thickness of the transparent adhesive layer ranges from 0.25 mm to 0.4 mm.

Optionally, in the above display module provided by the embodiment of the present disclosure, a haze value of the transparent reflecting layer ranges from 5% to 15%.

Optionally, in the above display module provided by the embodiment of the present disclosure, a material of the transparent reflecting layer is PET, and a thickness of the transparent reflecting layer ranges from 0.5 mm to 1 mm.

Optionally, in the above display module provided by the embodiment of the present disclosure, a material of the transparent light guide plate is glass.

Optionally, in the above display module provided by the embodiment of the present disclosure, a light emitting surface of the side-type light source is parallel to the light incident surface of the transparent light guide plate, and the side-type light source is an LED light bar.

Correspondingly, an embodiment of the present disclosure further provides a transparent display apparatus, including: the above display module provided by the embodiment of the present disclosure, and a transparent liquid crystal display screen on a light emitting surface of the display module.

Optionally, the above transparent display apparatus provided by the embodiment of the present disclosure further includes a metal frame disposed around the transparent liquid crystal display screen and configured to fix the transparent liquid crystal display screen and the display module, wherein the metal frame includes a plurality of grooves, and the transparent liquid crystal display screen and the display module are embedded in the corresponding grooves.

Optionally, in the above transparent display apparatus provided by the embodiment of the present disclosure, a set distance exists between the groove in which the display module is embedded and the groove in which the transparent liquid crystal display screen is embedded.

Optionally, the above transparent display apparatus provided by the embodiment of the present disclosure further includes a first transparent cover plate located on a side of a light emitting surface of the transparent liquid crystal display screen; wherein the first transparent cover plate and the transparent liquid crystal display screen are in contact with each other and are embedded in the same groove.

Optionally, the above transparent display apparatus provided by the embodiment of the present disclosure further includes a second transparent cover plate located on a side of the display module away from the transparent liquid crystal display screen; wherein the second transparent cover plate and the display module are not in contact with each other and are embedded in different grooves.

Optionally, in the above transparent display apparatus provided by the embodiment of the present disclosure, the side-type light source is fixed on an inner surface of a side, facing the light incident surface of the transparent light guide plate, of the metal frame.

DETAILED DESCRIPTION OF THE EMBODIMENTS

Figure 1:
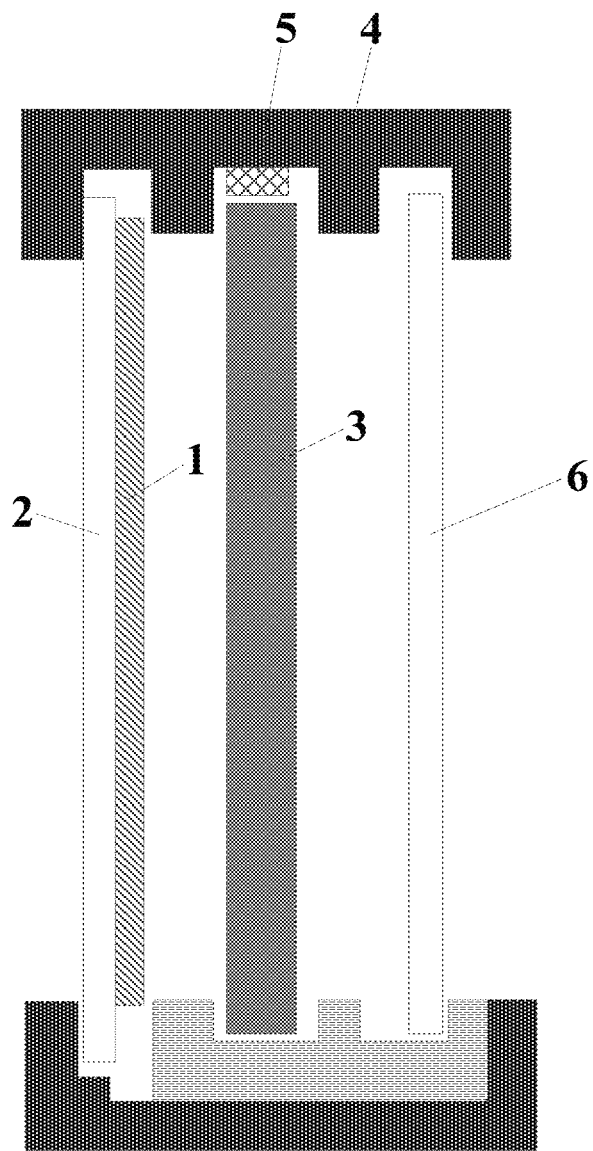
FIG. 1 is a schematic diagram of a cross-sectional structure of a transparent display apparatus.

In order to make the objectives, technical solutions, and advantages of embodiments of the present disclosure clearer, the technical solutions of the embodiments of the present disclosure will be described clearly and completely with reference to the accompanying drawings of the embodiments of the present disclosure. Apparently, the described embodiments are some, but not all, embodiments of the present disclosure. Under the condition of no conflict, the embodiments in the present disclosure and the features in the embodiments can be combined with each other. Based on the described embodiments of the present disclosure, all other embodiments attainable by those ordinarily skilled in the art without involving any inventive effort are within the protection scope of the present disclosure.

Unless defined otherwise, technical terms or scientific terms used in the present disclosure shall have the ordinary meaning as understood by those ordinarily skilled in the art to which the present disclosure belongs. The word "include" or "comprise", and other similar words used in the present disclosure mean that a component or an article that precedes the word is inclusive of the component or article listed after the word and equivalents thereof, but does not exclude other components or articles. Similar words such as "connection" or "connected" are not limited to physical or mechanical connections, but may include electrical connections, whether direct or indirect. The terms "inner", "outer", "upper", "lower", and the like are used merely to denote a relative positional relationship that may change accordingly when the absolute position of an object being described changes.

It should be noted that dimensions and shapes of various figures in the drawings are not to truly scale and are intended to be merely illustrative of the present disclosure. The same or similar reference numerals refer to the same or similar components or components having the same or similar functions throughout.

With the development of a liquid crystal display industry, a transparent display technology is gradually better utilized, such as: window display, shopping mall advertising, museum display transparent display, refrigerator door transparent display, architectural media and the like.

At present, transparent liquid crystal displays on the market are mostly used in scenes where a background board is a white cavity, such as refrigerators and display windows. However, if a liquid crystal screen is applied to a window as a transparent display, the front display brightness is low due to a simple structure of the window, an overall structure is thin, and a white cavity cannot be constructed. The structure is shown in FIG. 1: a liquid crystal display screen 1 is attached to a front glass cover plate 2, a glass light guide plate 3 is located in the middle, a metal frame 4 is located on a periphery, an LED light bar 5 is attached to the metal frame 4, and a rear glass cover plate 6 is further disposed on a side of the light guide plate 3 facing away from the liquid crystal display screen 1. A function of the light guide plate 3 is to convert a linear light source emitted by the LED light bar 5 into a surface light source. The light will be totally reflected after entering the light guide plate 3.

Figure 2:
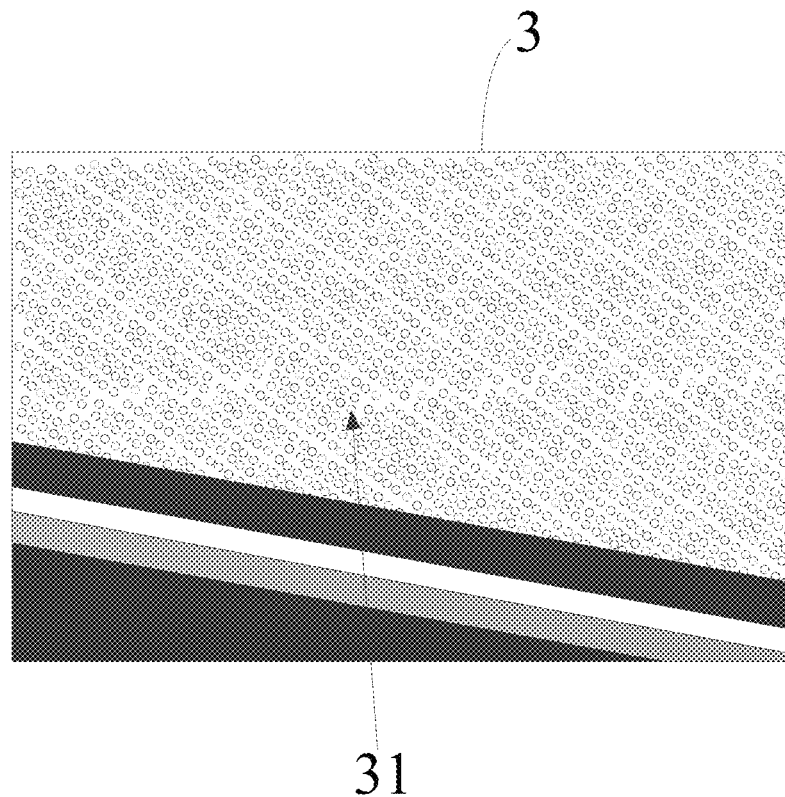
FIG. 2 is a schematic diagram of a grid dot surface of a light guide plate in FIG. 1.
Figure 3:
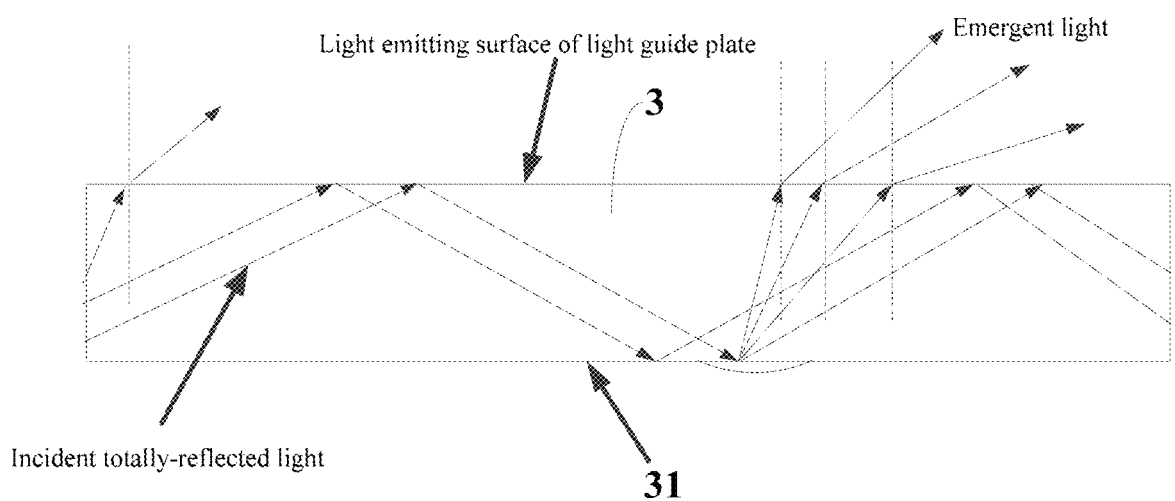
FIG. 3 is a schematic diagram of incident light and emergent light of a light guide plate in FIG. 1.

In order to let the light be emitted, as shown in FIG. 2, FIG. 2 is a top view schematic structural diagram of a grid dot surface of a light guide plate, one side of the light guide plate 3 is provided with a grid dot surface 31 to destroy a total reflection, so that the light is emitted. As shown in FIG. 3, FIG. 3 is a schematic diagram of light emission after incident totally-reflected light enters the light guide plate 3 on which the grid dot surface 31 is disposed.

Based on a principle of the light guide plate, the light entering the light guide plate 3 from the LED light bar 5 is refracted by the grid dot surface of the light guide plate 3, and a large part of the light is emitted from a side viewing angle of the light guide plate 3, resulting in very low front viewing angle brightness of the transparent display of a side-type module structure and poor picture display quality, and since the light guide plate is a glass light guide plate 3, gird dot patterns may be seen from the side viewing angle, which affects a display effect; and the display effect of the front viewing angle is darker, and the brightness is low.

According to the principle of the light guide plate, most of the light incident from the LED light bar 5 is eventually emitted from the side viewing angle of the light guide plate 3. In order to solve this problem, a normal side-type module is provided with film materials such as a prism sheet and a diffusion sheet on the upper side of the light guide plate 3, so that the light emitted from the side viewing angle of the light guide plate 3 form a uniform surface light source, and since the film materials such as a reflecting sheet and the prism sheet are both non-transparent materials, a solution of disposing the reflecting sheet and the prism sheet cannot be applied to a transparent display technology.

Figure 4A:
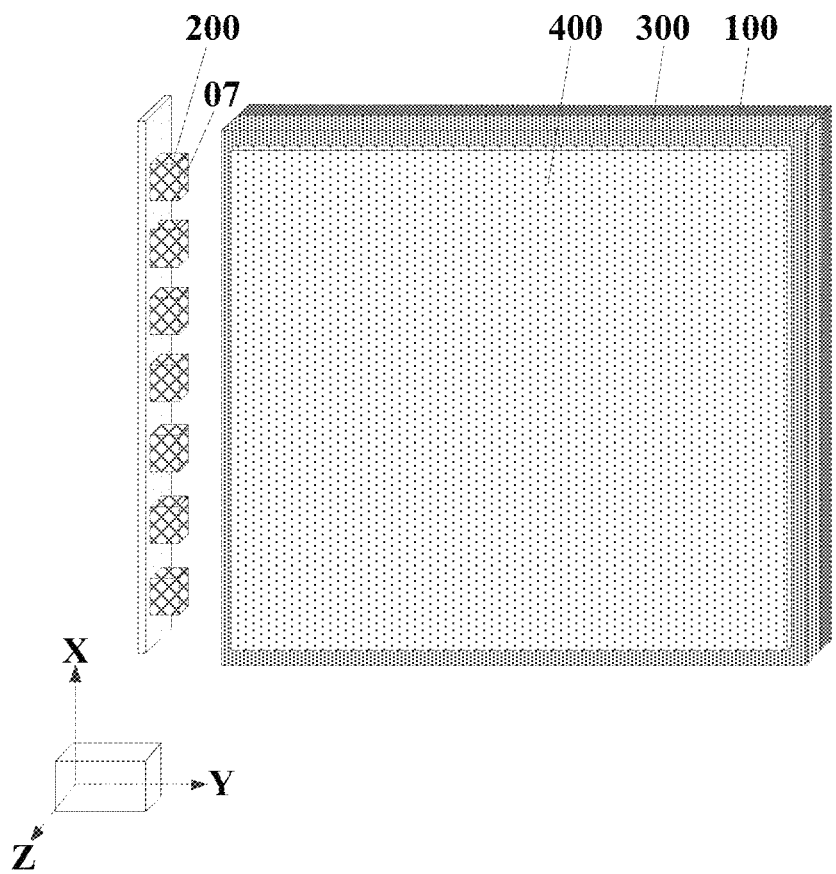
FIG. 4A is a schematic diagram of a three-dimensional structure of a display module provided by an embodiment of the present disclosure.
Figure 4B:
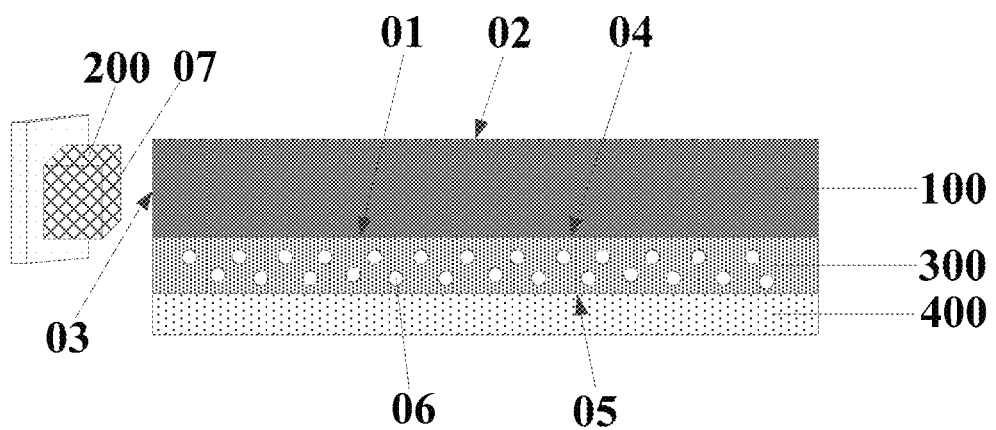
FIG. 4B is a schematic diagram of a cross-sectional structure of a display module provided by an embodiment of the present disclosure.

Therefore, in order to solve the problems of low front viewing angle brightness and poor picture display quality of the transparent display of the side-type module structure in the transparent display technology, an embodiment of the present disclosure provides a display module, as shown in FIG. 4A and FIG. 4B. FIG. 4A is a schematic diagram of a three-dimensional structure of a display module, and FIG. 4B is a schematic diagram of a cross-sectional structure of a display module.

The display module includes: a transparent light guide plate 100, including a grid dot surface 01 and a light emitting surface 02 that are disposed opposite each other, and a light incident surface 03 connected to the grid dot surface 01 and the light emitting surface 02; a side-type light source 200, located on a side of the light incident surface 03 of the transparent light guide plate 100; a transparent adhesive layer 300, where the transparent adhesive layer 300 includes a first surface 04 and a second surface 05 that are disposed opposite each other, and the first surface 04 is disposed in contact with the grid dot surface 01 of the transparent light guide plate 100; and a refractive index of the transparent adhesive layer 300 is different from a refractive index of the transparent light guide plate 100, and the transparent adhesive layer 300 contains particles 06 that scatter light; and a transparent reflecting layer 400, disposed in contact with the second surface 05 of the transparent adhesive layer 300, and having a set haze.

According to the above display module provided by the embodiment of the present disclosure, by attaching the transparent adhesive layer with the refractive index different from that of the transparent light guide plate on the grid dot surface of the transparent light guide plate, and attaching the transparent reflecting layer with the set haze on a side of the transparent adhesive layer away from the transparent light guide plate, the light originally lost from grid dots of the grid dot surface of the transparent light guide plate may enter the transparent adhesive layer, and for the light entering the transparent adhesive layer, on one hand, since the refractive index of the transparent adhesive layer is different from that of the transparent light guide plate, a refraction angle of the light will change, the light is homogenized, and the transparent adhesive layer contains the particles that scatter the light, so the light is further homogenized; and on the other hand, after the light with the refraction angle changing enters the transparent reflecting layer with the set haze, the light is reflected back under the action of the transparent reflecting layer with the set haze, so that a front viewing angle brightness of a transparent liquid crystal display screen adopting the display module provided by the embodiment of the present disclosure as a backlight module is greatly improved, and the picture brightness is homogenized.

In specific implementation, in the above display module provided by the embodiment of the present disclosure, as shown in FIG. 4A and FIG. 4B, since the grid dot surface 01 of the transparent light guide plate 100 and the first surface 04 of the transparent adhesive layer 300 are disposed in contact with each other (that is, the two are fully attached), the transparent adhesive layer 300 may shield the grid dots on the grid dot surface 01 of the transparent light guide plate 100 from the side viewing angle, and improve the display quality. Therefore, the display module provided by the embodiment of the present disclosure has the advantages of simple structure, low cost, high display quality and the like.

In specific implementation, as shown in FIG. 4B, the particles 06 may be impurities, bubbles, foreign bodies, etc. Of course, the particles such as the impurities, the bubbles, the foreign bodies, etc. are arranged as long as they do not affect transparency of the transparent adhesive layer 300, so that the quantity of the particles 06 is set on the basis of not affecting the transparency of the transparent adhesive layer 300.

In specific implementation, the refractive index of the transparent adhesive layer in the above display module provided by the embodiment of the present disclosure may be less than the refractive index of the transparent light guide plate, or may be greater than the refractive index of the transparent light guide plate, so that the refraction angle changes when the light enters the transparent adhesive layer from the transparent light guide plate, and the light is homogenized.

In specific implementation, on one hand, the transparent adhesive layer needs to ensure transparency, and on the other hand, the refractive index of the transparent adhesive layer is different from the refractive index of the transparent light guide plate. Therefore, in the above display module provided by the embodiment of the present disclosure, a material of the transparent adhesive layer is preferably an optical clear adhesive (OCA), and a thickness of the transparent adhesive layer ranges from 0.25 mm to 0.4 mm. Specifically, an optical acrylic adhesive is made into a non-substrate material, and then an upper bottom layer and a lower bottom layer are each attached with a layer of release film, that is, the transparent adhesive layer is a double-sided adhesive tape of the non-substrate material.

In specific implementation, since the transparent reflecting layer needs to reflect light on the basis of ensuring transparency, it needs to have a certain haze, but if a haze value of the transparent reflecting layer is too low, the light reflecting effect is not good; and if the haze value of the transparent reflecting layer is too high, the transparency of the transparent reflecting layer will be affected, and then the display brightness of the front viewing angle will be affected. Therefore, in order to effectively reflect light without affecting the display brightness of the front viewing angle, in the above display module provided by the embodiment of the present disclosure, the haze value of the transparent reflecting layer ranges from 5% to 15%.

In specific implementation, in the above display module provided by the embodiment of the present disclosure, a material of the transparent reflecting layer may be PET, which has higher hardness and better transparency; and a thickness of the transparent reflecting layer ranges from 0.5 mm to 1 mm.

In specific implementation, the above display module provided by the embodiment of the present disclosure is used as the backlight module of the transparent liquid crystal display screen. Therefore, in order to improve the light transmittance of the transparent light guide plate to the light source so as to improve a utilization rate of the light source by the transparent liquid crystal screen and the picture display quality, a material of the transparent light guide plate in the embodiment of the present disclosure is preferably glass. In addition, a surface of the light emitting surface of the transparent light guide plate is flat and cannot have any other structures, and the grid dot surface of the transparent light guide plate cannot have any other structure except for the grid dots, so as to avoid light scattering and affect transmittance. In specific implementation, in order to make the light emitted from the side-type light source enter the light incident surface of the transparent light guide plate as much as possible, in the above display module provided by the embodiment of the present disclosure, as shown in FIG. 4A and FIG. 4B, a light emitting surface 07 of the side-type light source 200 is parallel to the light incident surface 03 of the transparent light guide plate 100, and the side-type light source 200 may be an LED light bar.

In specific implementation, a method for laminating each film layer in the above display module provided by the embodiment of the present disclosure may specifically include the following steps.

The transparent light guide plate is put in a laminating device, a protective film on a side of the grid dot surface of the transparent light guide plate is removed, and a release film on a side of the transparent adhesive layer is peeled off.

The side, with the release film peeled off, of the transparent adhesive layer and the side of the grid dot surface of the transparent light guide plate are aligned.

A roller is configured to roll the other side, retaining the release film, of the transparent adhesive layer to attach the transparent adhesive layer to the transparent light guide plate.

The release film on the other side of the transparent adhesive layer is peeled off.

The other side of the transparent adhesive layer and the transparent reflecting layer are aligned.

The transparent reflecting layer is rolled by the roller, and the transparent reflecting layer is attached to the transparent adhesive layer.

Specifically, a lamination pressure of the laminating device adopted above ranges from 0.3 Mpa to 0.6 Mpa, preferably 0.45 Mpa; a rolling speed of the roller ranges from 40 mm/s to 80 mm/s, preferably 60 mm/s; and alignment accuracy ranges from 0.2 mm to 0.4 mm, preferably 0.3 mm.

Specifically, after the transparent reflecting layer is attached to the transparent adhesive layer, the method may further include: the display module provided by the embodiment of the present disclosure is subjected to defoaming treatment to ensure that there is no bubble in a veneer.

Specifically, a temperature of the above defoaming treatment ranges from 45° C. to 55° C., preferably 50° C.; the pressure of the defoaming treatment ranges from 0.3 Mpa to 0.5 Mpa, preferably 0.4 Mpa; and the time of the defoaming treatment ranges from 30 min to 60 min, preferably 40 min.

Figure 5:
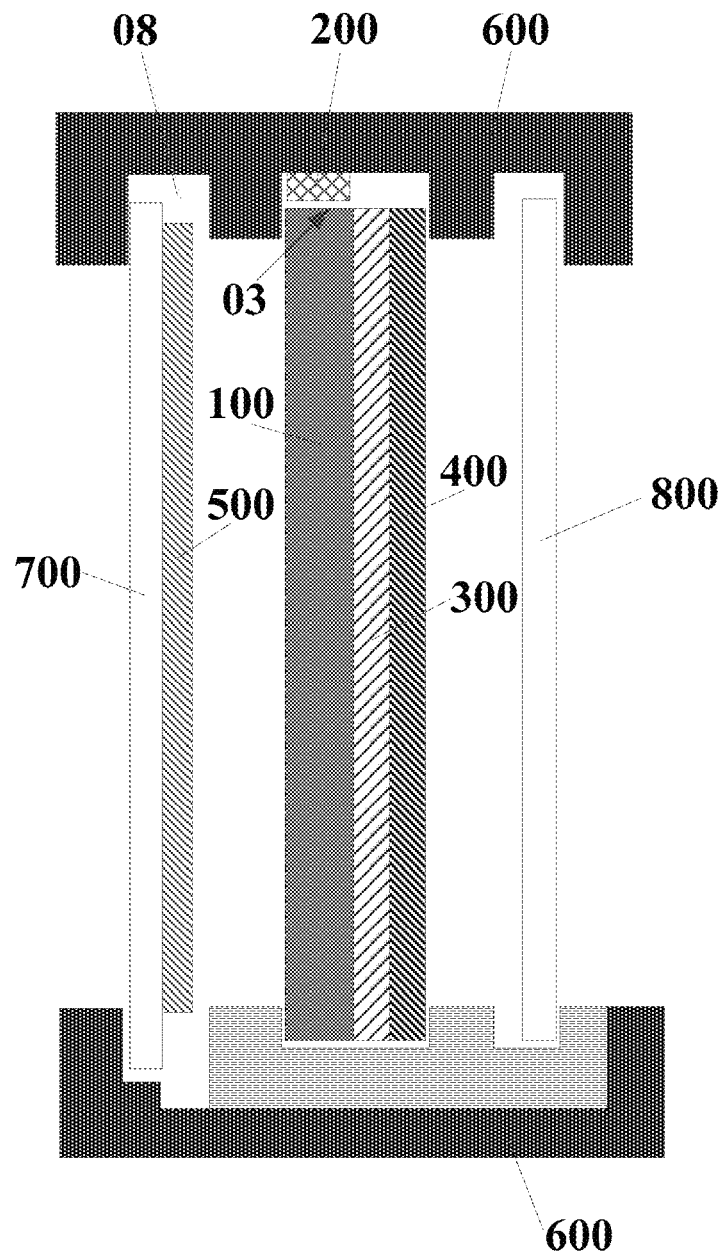
FIG. 5 is a schematic diagram of a cross-sectional structure of a transparent display apparatus provided by an embodiment of the present disclosure.

Based on the same inventive concept, an embodiment of the present disclosure further provides a transparent display apparatus, and as shown in FIG. 5, FIG. 5 is a schematic diagram of a cross-sectional structure of a transparent display apparatus. The transparent display apparatus specifically includes: the above display module (symbols 100-400) provided by the embodiment of the present disclosure, and a transparent liquid crystal display screen 500 located on a light emitting surface of the above display module.

According to the above transparent display apparatus provided by the embodiment of the present disclosure, by attaching a transparent adhesive layer with a refractive index different from that of a transparent light guide plate on a grid dot surface of the transparent light guide plate, and attaching a transparent reflecting layer with a set haze on a side of the transparent adhesive layer away from the transparent light guide plate, the light originally lost from grid dots of the grid dot surface of the transparent light guide plate may enter the transparent adhesive layer, and for the light entering the transparent adhesive layer, on one hand, since the refractive index of the transparent adhesive layer is different from that of the transparent light guide plate, a refraction angle of the light will change, the light is homogenized, and the transparent adhesive layer contains particles that scatter the light, so the light is further homogenized; and on the other hand, after the light with the refraction angle changing enters the transparent reflecting layer with the set haze, the light is reflected back under the action of the transparent reflecting layer with the set haze, so that a front viewing angle brightness of the transparent liquid crystal display screen is greatly improved, and the picture brightness is homogenized.

In specific implementation, in order to fix and support the liquid crystal display screen and the above display module to form the transparent display apparatus and safely protect the liquid crystal display screen and the above display module, the above transparent display apparatus provided by the embodiment of the present disclosure, as shown in FIG. 5, further includes a metal frame 600 disposed around the transparent liquid crystal display screen 500 and configured to fix the transparent liquid crystal display screen 500 and the above display module, the metal frame 600 has a plurality of grooves 08, and the transparent liquid crystal display screen 500 and the above display module are embedded in the corresponding grooves 08.

It should be noted that the metal frame 600 is opaque.

It should be noted that gaps are reserved between the transparent liquid crystal display screen 500 and the corresponding groove 08 and between the above display module and the corresponding groove 08 in FIG. 5 illustrated in the embodiment of the present disclosure, the reserved gaps are for illustrative purposes only, and when manufacturing the transparent display apparatus actually, the transparent liquid crystal display screen 500 and the above display module are in contact and fixed with the corresponding grooves 08.

It should be noted that, as shown in FIG. 5, the metal frame 600 illustrated in the embodiment of the present disclosure is only one structure, of course, may also be other structures, as long as it can meet the requirements of fixing components in the transparent liquid crystal display screen 500 and the above display module.

In specific implementation, in the above transparent display apparatus provided by the embodiment of the present disclosure, as shown in FIG. 5, a set distance exists between the groove 08 in which the display module (symbols 100-400) is embedded and the groove 08 in which the transparent liquid crystal display screen 500 is embedded, that is, a gap is reserved between the transparent liquid crystal display screen 500 provided by the embodiment of the present disclosure and the display module (symbols 100-400).

In specific implementation, in order to protect a light emitting surface of the transparent liquid crystal display screen from being damaged by external conditions, the above transparent display apparatus provided by the embodiment of the present disclosure, as shown in FIG. 5, further includes a first transparent cover plate 700 located on a side, where the light emitting surface is located, of the transparent liquid crystal display screen 500; the light emitting surface of the transparent liquid crystal display screen 500 is disposed in contact with the first transparent cover plate 700; and the first transparent cover plate 700 and the transparent liquid crystal display screen 500 are in contact with each other and are embedded in the same groove 08.

In specific implementation, in order to protect the display module from being damaged by external conditions, the above transparent display apparatus provided by the embodiment of the present disclosure, as shown in FIG. 5, may further include a second transparent cover plate 800 located on a side of the display module (symbols 100-400) facing away from the transparent liquid crystal display screen 500; and the second transparent cover plate 800 and the display module (symbols 100-400) are not in contact with each other and are embedded in different grooves 08.

In specific implementation, in the above transparent display apparatus provided by the embodiment of the present disclosure, as shown in FIG. 5, a side-type light source 200 is fixed on an inner surface of a side, facing the light incident surface 03 of the transparent light guide plate 100, of the metal frame 600.

In summary, according to the embodiments of the present disclosure, the transparent adhesive layer and the transparent reflecting layer with the set haze are attached to the grid dot surface of the transparent light guide plate of the side-type display module to replace film materials such as a reflecting sheet, a prism sheet and a diffusion sheet with a light-gathering effect of a normal side-type display module, so that the front viewing angle brightness of the transparent display apparatus is greatly improved, and the grid dots of the grid dot surface of the on the transparent light guide plate from the side viewing angle may be shielded, a structure is made simpler, and a white cavity structure does not need to be disposed as a background board. Therefore, the side-type display module provided by the embodiment of the present disclosure may achieve normal visualization outdoors, and is of great significance for the application of the liquid crystal display screen in the field of transparent display.

According to the above display module and the above transparent display apparatus provided by the embodiments of the present disclosure, by attaching the transparent adhesive layer with the refractive index different from that of the transparent light guide plate on the grid dot surface of the transparent light guide plate, and attaching the transparent reflecting layer with the set haze on the side of the transparent adhesive layer away from the transparent light guide plate, the light originally lost from grid dots of the grid dot surface of the transparent light guide plate can enter the transparent adhesive layer, and for the light entering the transparent adhesive layer, on one hand, since the refractive index of the transparent adhesive layer is different from that of the transparent light guide plate, the refraction angle of the light will change, the light is homogenized, and the transparent adhesive layer contains the particles that scatter the light, so the light is further homogenized; and on the other hand, after the light with the refraction angle changing enters the transparent reflecting layer with the set haze, the light is reflected back under the action of the transparent reflecting layer with the set haze, so that the front viewing angle brightness of the transparent liquid crystal display screen adopting the display module provided by the embodiment of the present disclosure as a backlight module is greatly improved, and the picture brightness is homogenized.

Although the preferred embodiments of the present disclosure have been described, additional variations and modifications may be made to these embodiments by those skilled in the art once the basic inventive concept is known. Therefore, it is intended that the appended claims be interpreted as including the preferred embodiments and all variations and modifications that fall within the scope of the present disclosure.

It will be apparent to those skilled in the art that various modifications and variations can be made in the embodiments of the present disclosure without departing from the spirit or scope of the embodiments of the present disclosure. Thus, if these modifications and variations of the embodiments of the present disclosure fall within the scope of the claims of the present disclosure and its equivalent technology, the present disclosure is also intended to include these modifications and variations.

What is claimed is:

1. A display module, comprising:
   a transparent light guide plate, comprising a surface having a plurality of grid dots and a light emitting surface that are disposed opposite each other, and a light incident surface connected to the surface having the plurality of grid dots and the light emitting surface;
   a side-type light source, located on a side of the light incident surface of the transparent light guide plate;
   a transparent adhesive layer, comprising a first surface and a second surface that are disposed opposite each other, wherein the first surface is disposed in contact with the surface having the plurality of grid dots of the transparent light guide plate; and a refractive index of the transparent adhesive layer is different from a refractive index of the transparent light guide plate, and the transparent adhesive layer contains particles that scatter light; and
   a transparent reflecting layer, disposed in contact with the second surface of the transparent adhesive layer, and having a set haze.

2. The display module according to claim 1, wherein a material of the transparent adhesive layer is an optical clear adhesive (OCA), and a thickness of the transparent adhesive layer ranges from 0.25 mm to 0.4 mm.

3. The display module according to claim 1, wherein a haze value of the transparent reflecting layer ranges from 5% to 15%.

4. The display module according to claim 1, wherein a material of the transparent reflecting layer is PET, and a thickness of the transparent reflecting layer ranges from 0.5 mm to 1 mm.

5. The display module according to claim 1, wherein a material of the transparent light guide plate is glass.

6. The display module according to claim 1, wherein a light emitting surface of the side-type light source is parallel to the light incident surface of the transparent light guide plate, and the side-type light source is an LED light bar.

7. A transparent display apparatus, comprising: a display module and a transparent liquid crystal display screen on a light emitting surface of the display module; wherein the display module comprises:
   a transparent light guide plate, comprising a surface having a plurality of grid dots and a light emitting surface that are disposed opposite each other, and a light incident surface connected to the surface having the plurality of grid dots and the light emitting surface;
   a side-type light source, located on a side of the light incident surface of the transparent light guide plate;
   a transparent adhesive layer, comprising a first surface and a second surface that are disposed opposite each other, wherein the first surface is disposed in contact with the surface having the plurality of grid dots of the transparent light guide plate; and a refractive index of the transparent adhesive layer is different from a refractive index of the transparent light guide plate, and the transparent adhesive layer contains particles that scatter light; and
   a transparent reflecting layer, disposed in contact with the second surface of the transparent adhesive layer, and having a set haze.

8. The transparent display apparatus according to claim 7, further comprising a metal frame disposed around the transparent liquid crystal display screen and configured to fix the transparent liquid crystal display screen and the display module, wherein the metal frame comprises a plurality of grooves, and the transparent liquid crystal display screen and the display module are embedded in the corresponding grooves.

9. The transparent display apparatus according to claim 8, wherein a set distance exists between the groove in which the display module is embedded and the groove in which the transparent liquid crystal display screen is embedded.

10. The transparent display apparatus according to claim 8, further comprising a first transparent cover plate located on a side of a light emitting surface of the transparent liquid crystal display screen; wherein
    the first transparent cover plate and the transparent liquid crystal display screen are in contact with each other and are embedded in a same groove.

11. The transparent display apparatus according to claim 8, further comprising a second transparent cover plate located on a side of the display module away from the transparent liquid crystal display screen; wherein
    the second transparent cover plate and the display module are not in contact with each other and are embedded in different grooves.

12. The transparent display apparatus according to claim 8, wherein the side-type light source is fixed on an inner surface of a side, facing the light incident surface of the transparent light guide plate, of the metal frame.

13. The transparent display apparatus according to claim 7, wherein a material of the transparent adhesive layer is an optical clear adhesive (OCA), and a thickness of the transparent adhesive layer ranges from 0.25 mm to 0.4 mm.

14. The transparent display apparatus according to claim 7, wherein a haze value of the transparent reflecting layer ranges from 5% to 15%.

15. The transparent display apparatus according to claim 7, wherein a material of the transparent reflecting layer is PET, and a thickness of the transparent reflecting layer ranges from 0.5 mm to 1 mm.

16. The transparent display apparatus according to claim 7, wherein a material of the transparent light guide plate is glass.

17. The transparent display apparatus according to claim 7, wherein a light emitting surface of the side-type light source is parallel to the light incident surface of the transparent light guide plate, and the side-type light source is an LED light bar.

* * * * *